Nov. 4, 1947.  O. F. SCHULZ  2,430,413
AUTOMOTIVE EFFICIENCY INDICATING INSTRUMENT
Filed April 4, 1945
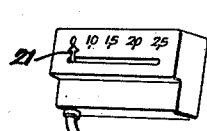
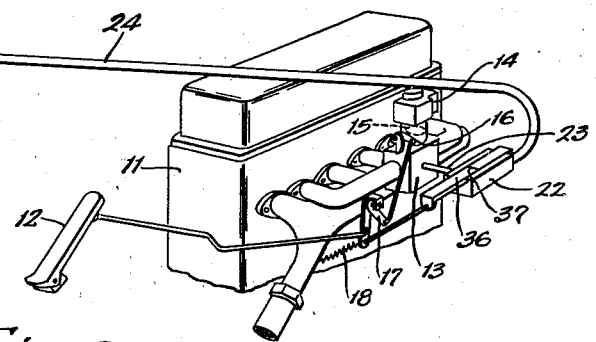
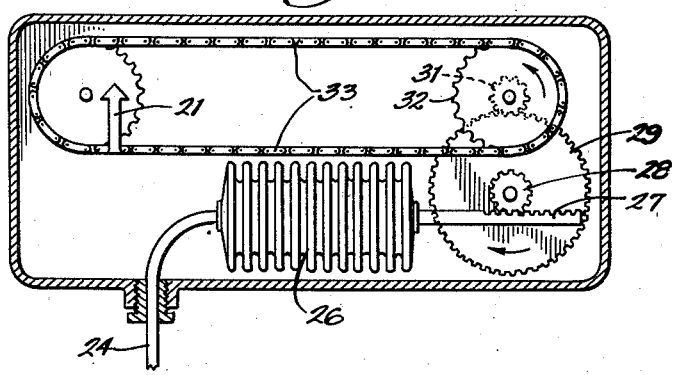
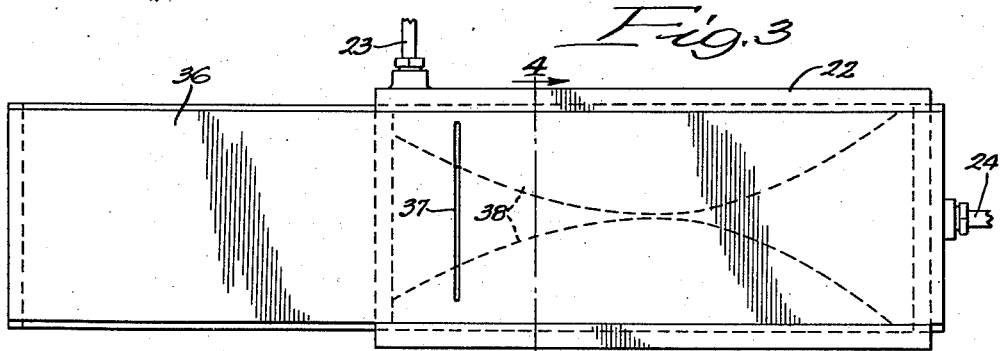
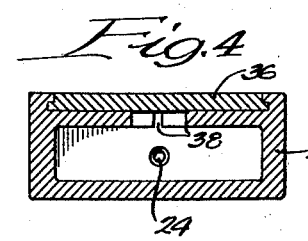
Inventor:
Otto F. Schulz,
By Kinning & Kinning & Robertson
Attorneys.

Patented Nov. 4, 1947

2,430,413

UNITED STATES PATENT OFFICE 2,430,413

AUTOMOTIVE EFFICIENCY INDICATING INSTRUMENT

Otto F. Schulz, Evanston, Ill.

Application April 4, 1945, Serial No. 586,604

2 Claims. (Cl. 73—114)

Few people know or can keep in mind the speed at which their cars are most economically driven. Furthermore, varying conditions, such as grade, wind and the like vary the speed at which driving is most economical. There is a need for a simple device which will indicate the miles per gallon being obtained at a given instant.

Of course there have been various devices for measuring the consumption of gasoline. Due to a desire for exactness and for indication of the gas consumption in absolute values which will permit comparison of one automobile with another, these have been highly complicated either in structure or in use, with the result that they were entirely unsuitable for ordinary use by the average motorist.

According to the present invention a simplified and fully automatic indicator is provided which will give the driver of an automobile an idea of the approximate variation in his mileage per gallon at different speeds and under various circumstances. Under some conditions it will be quite accurate, but extreme accuracy is not essential because it is used primarily to indicate to the driver the approximate relationship in his mileage per gallon between different speeds in the same car rather than as a basis of comparison between different cars.

Additional objects and advantages will be apparent from the following description and from the drawings in which Fig. 1 is a somewhat diagrammatic perspective view of the apparatus as applied to an automobile engine;

Fig. 2 is a diagrammatic sectional view through the indicator case;

Fig. 3 is a diagrammatic plan view of the sliding valve;

Fig. 4 is a vertical sectional view taken approximately on the line 4—4 of Fig. 3.

The invention has been illustrated in connection with a gasoline engine 11 controlled by accelerator 12 which, in the conventional manner operates a valve or throttle 15 between an intake manifold 13 and a carburetor 14. The throttle, as shown, is controlled by a lever 16. In the illustrated form this is connected to one arm of a bell-crank lever 17 the other arm of which is connected to the accelerator. The lost-motion conventionally provided in this bell-crank lever is not pertinent to the present invention. A suitable spring 18 urges the parts towards the position in which the throttle valve 15 is approximately closed.

As is well known, the manifold pressure varies under different conditions of speed and throttle position. According to the present invention this manifold pressure is used in conjunction with a sliding valve controlled by the accelerator 12 to control an indicator needle 21 to give an indication of the rate of consumption of gasoline in terms of miles per gallon.

A valve box 22 is connected by a pipe 23 to the intake manifold and by pipe 24 to a resiliently expanding chamber such as a Sylphon bellows 26 in the indicating instrument. The Sylphon bellows tends to assume the extended position shown in Fig. 2. Under influence of the suction from the manifold it contracts. As it contracts it draws a rack bar 27 meshing with a pinion 28, and a gear 29 rigid with the gear 28 drives the pinion 31 which is rigid with a sprocket 32 driving a chain 33 by which the indicator 21 is carried. Of course any other means could be used for driving an indicator by the bellows 26, some means giving an increase of movement being preferred.

If the bellows 26 were connected directly to the manifold the indicator 21 would merely indicate manifold pressure. Instead, the indication is converted to an approximation of miles per gallon by the computing valve box 22. The amount of air which is drawn through the tube 23 is limited by the relatively small size of the tube hence it is possible, by bleeding atmospheric air into the box 22, to establish in the box any pressure between the value of the suction in the manifold 13, and atmospheric pressure.

The bleeding of air is controlled by a slide valve plate 36 which, as seen in Fig. 1, is operated by the accelerator 12. The slide valve 36 is in the form of a plate having a valve slot 37 cut therein which slides back and forth over a specially shaped valve seat in the form of a slot 38 in the upper wall of the valve box 22. The slide valve plate 36 closes off all of the slot 38 except that portion underlying the slot 37.

With the accelerator in the released position and the throttle 15 in the idling or approximately closed position the valve plate 36 would be in approximately the position shown in Fig. 3 or further to the left and over half of the length of the valve slot 37 would be open. Hence the suction in the valve box 22, and consequently in the bellows 26, would be largely relieved and the bellows 26 would expand, moving the indicator 21 to a position indicating relatively few miles per gallon.

Upon pressing the accelerator to increase the speed of the vehicle the slot 37 would be moved toward the narrow part of slot 38. This would reduce the amount of atmospheric air bleeding into the valve box 22. But at the same time the throttle would be opened so that there would be a momentary decrease of suction in the manifold 13 and hence there would be little effect on the position of indicator 21, or it might even move downwardly. However, as the engine speeds up toward progressively more efficient speeds the suction in the manifold 13 will increase and the indicator 21 will move towards higher indications of miles per gallon.

Should the accelerator be pressed further to cause the car to speed beyond its most efficient speed the slot 37 would pass the constricted portion of slot 38 and would be opened progressively further, thus bleeding more and more atmospheric air into box 22, and reducing the pressure therein, and consequently permitting the bellows 26 to expand and move the indicator 21 to a lower number of miles per gallon.

The shape of the slot 38, the width of the slot 37 and the size of connecting pipe 23 should be determined for each make of vehicle, by calculation or test, to give the closest approximation to a true indication of the relative miles per gallon at different speeds or under different conditions. The shape can be such as to make the indication quite accurate for different speeds under constant conditions (such as a level road with no wind), and this shape may be preferred. Slight departures may be found desirable, however, to give better results under other conditions.

On a level road without wind the accelerator or throttle position determines the speed of the car and therefore even the illustrated form of the invention has the position of the sliding valve related to the speed of the vehicle.

The drawings are largely diagrammatic, not attempting to show all details. For example a guide roller would be provided under rack bar 27. Also the valve box 22 would be much smaller, compared to engine size, than in Fig. 1.

I claim:

1. A device for use with an internal combustion engine having an intake manifold and a throttle controlling the admission of air to the manifold, said device comprising a resiliently expanding chamber, conduit means connected to said chamber and including a constricted passage connected with the manifold said chamber being contracted by the suction in the manifold, and a valve for bleeding air into the conduit means between the constricted passage and the expanding chamber, said valve being controlled in conjunction with the control of the throttle and including a valve slot shaped to first decrease and then increase the area of the valve opening as the throttle is progressively opened.

2. A device for use with an internal combustion engine having an intake manifold and a throttle controlling the admission of air to the manifold, said device comprising a resiliently expanding chamber, conduit means connected to said chamber and including a constricted passage connected with the manifold, said chamber being contracted by the suction in the manifold, and a valve for bleeding air into the conduit means between the constricted passage and the expanding chamber, said valve being controlled in conjunction with the control of the throttle and being so constructed as to first decrease and then increase the area of the valve opening as the throttle is progressively opened.

OTTO F. SCHULZ.

REFERENCES CITED

The following references are of record in the file of this patent:

UNITED STATES PATENTS

| Number | Name | Date |
|---|---|---|
| 2,207,880 | Skoldberg | July 16, 1940 |
| 1,181,566 | Bowden | May 2, 1916 |
| 898,213 | Gibson | Sept. 8, 1908 |
| 1,456,621 | Chadwick | May 29, 1923 |
| 597,884 | Kirkwood | Jan. 25, 1898 |
| 2,362,446 | Bodine | Nov. 14, 1944 |
| 1,867,698 | Harris | July 19, 1932 |
| 1,676,983 | Eremeeff | July 10, 1928 |